US012095025B2

(12) United States Patent
Tan et al.

(10) Patent No.: US 12,095,025 B2
(45) Date of Patent: *Sep. 17, 2024

(54) ASYMMETRIC BATTERY HAVING A SEMI-SOLID CATHODE AND HIGH ENERGY DENSITY ANODE

(71) Applicant: 24M Technologies, Inc., Cambridge, MA (US)

(72) Inventors: Taison Tan, Pasadena, CA (US); Yet-Ming Chiang, Weston, MA (US); Naoki Ota, Lexington, MA (US); Throop Wilder, Lincoln, MA (US); Mihai Duduta, Somerville, MA (US)

(73) Assignee: 24M Technologies, Inc., Cambridge, MA (US)

( * ) Notice: Subject to any disclaimer, the term of this patent is extended or adjusted under 35 U.S.C. 154(b) by 20 days.

This patent is subject to a terminal disclaimer.

(21) Appl. No.: 17/840,816

(22) Filed: Jun. 15, 2022

(65) Prior Publication Data

US 2023/0085181 A1 Mar. 16, 2023

Related U.S. Application Data

(63) Continuation of application No. 17/182,674, filed on Feb. 23, 2021, now Pat. No. 11,394,049, which is a
(Continued)

(51) Int. Cl.
*H01M 10/0525* (2010.01)
*H01M 4/02* (2006.01)
(Continued)

(52) U.S. Cl.
CPC ......... *H01M 10/0525* (2013.01); *H01M 4/13* (2013.01); *H01M 4/134* (2013.01);
(Continued)

(58) Field of Classification Search
CPC .... H01M 10/0525; H01M 4/13; H01M 4/134; H01M 4/362; H01M 4/386; H01M 4/387; H01M 10/052; H01M 4/587
See application file for complete search history.

(56) References Cited

U.S. PATENT DOCUMENTS 7,972,727 B2 7/2011 Christensen et al.
8,071,238 B2 12/2011 Le
(Continued)

FOREIGN PATENT DOCUMENTS

CN 102347482 2/2012
JP S6035466 A 2/1985
(Continued)

OTHER PUBLICATIONS

Extended European Search Report for European Application No. EP22212603.9, mailed on May 12, 2023, 7 pages.
(Continued)

*Primary Examiner* — Stewart A Fraser
(74) *Attorney, Agent, or Firm* — Cooley LLP

(57) ABSTRACT

Embodiments described herein relate generally to devices, systems and methods of producing high energy density batteries having a semi-solid cathode that is thicker than the anode. An electrochemical cell can include a positive electrode current collector, a negative electrode current collector and an ion-permeable membrane disposed between the positive electrode current collector and the negative electrode current collector. The ion-permeable membrane is spaced a first distance from the positive electrode current collector and at least partially defines a positive electroactive zone. The ion-permeable membrane is spaced a second distance from the negative electrode current collector and at least partially defines a negative electroactive zone. The second distance is less than the first distance. A semi-solid cathode that includes a suspension of an active material and
(Continued)

a conductive material in a non-aqueous liquid electrolyte is disposed in the positive electroactive zone, and an anode is disposed in the negative electroactive zone.

26 Claims, 2 Drawing Sheets

Related U.S. Application Data continuation of application No. 16/692,206, filed on Nov. 22, 2019, now Pat. No. 10,964,973, which is a continuation of application No. 15/792,052, filed on Oct. 24, 2017, now Pat. No. 10,522,870, which is a continuation of application No. 15/228,259, filed on Aug. 4, 2016, now Pat. No. 9,831,522, which is a continuation of application No. 14/202,606, filed on Mar. 10, 2014, now Pat. No. 9,437,864.

(60) Provisional application No. 61/787,372, filed on Mar. 15, 2013.

(51) Int. Cl.
- *H01M 4/13* (2010.01)
- *H01M 4/134* (2010.01)
- *H01M 4/36* (2006.01)
- *H01M 4/38* (2006.01)
- *H01M 4/48* (2010.01)
- *H01M 4/587* (2010.01)
- *H01M 10/052* (2010.01)

(52) U.S. Cl.
CPC ........... *H01M 4/362* (2013.01); *H01M 4/386* (2013.01); *H01M 4/387* (2013.01); *H01M 10/052* (2013.01); H01M 2004/021 (2013.01); H01M 2004/023 (2013.01); H01M 4/38 (2013.01); H01M 4/483 (2013.01); H01M 4/587 (2013.01); Y02E 60/10 (2013.01); Y02P 70/50 (2015.11)

(56) References Cited

U.S. PATENT DOCUMENTS

| | | | |
|---|---|---|---|
| 8,129,050 B2 | 3/2012 | Kim et al. | |
| 8,722,226 B2 | 5/2014 | Chiang et al. | |
| 8,722,227 B2 | 5/2014 | Chiang et al. | |
| 8,778,552 B2 | 7/2014 | Chiang et al. | |
| 8,993,159 B2 | 3/2015 | Chiang et al. | |
| 9,153,833 B2 | 10/2015 | Chiang et al. | |
| 9,178,200 B2 | 11/2015 | Bazzarella et al. | |
| 9,184,464 B2 | 11/2015 | Chiang et al. | |
| 9,203,092 B2 | 12/2015 | Slocum et al. | |
| 9,293,781 B2 | 3/2016 | Chiang et al. | |
| 9,362,583 B2 | 6/2016 | Chiang et al. | |
| 9,385,392 B2 | 7/2016 | Chiang et al. | |
| 9,401,501 B2 | 7/2016 | Bazzarella et al. | |
| 9,437,864 B2 * | 9/2016 | Tan .................... | H01M 4/386 |
| 9,484,569 B2 | 11/2016 | Doherty et al. | |
| 9,583,780 B2 | 2/2017 | Chiang et al. | |
| 9,614,231 B2 | 4/2017 | Carter et al. | |
| 9,786,944 B2 | 10/2017 | Chiang et al. | |
| 9,812,674 B2 | 11/2017 | Bazzarella et al. | |
| 9,825,280 B2 | 11/2017 | Chiang et al. | |
| 9,831,518 B2 | 11/2017 | Chiang et al. | |
| 9,831,519 B2 | 11/2017 | Chiang et al. | |
| 9,831,522 B2 | 11/2017 | Tan et al. | |
| 10,115,970 B2 | 10/2018 | Ota et al. | |
| 10,122,044 B2 | 11/2018 | Tan et al. | |
| 10,153,651 B2 | 12/2018 | Taylor et al. | |
| 10,181,587 B2 | 1/2019 | Ota et al. | |
| 10,230,128 B2 | 3/2019 | Chiang et al. | |
| 10,236,518 B2 | 3/2019 | Chiang et al. | |
| 10,411,310 B2 | 9/2019 | Chiang et al. | |
| 10,483,582 B2 | 11/2019 | Chiang et al. | |
| 10,497,935 B2 | 12/2019 | Ota et al. | |
| 10,522,870 B2 * | 12/2019 | Tan .................... | H01M 4/386 |
| 10,566,581 B2 | 2/2020 | Bazzarella et al. | |
| 10,566,603 B2 | 2/2020 | Slocum et al. | |
| 10,593,952 B2 | 3/2020 | Ota et al. | |
| 10,601,239 B2 | 3/2020 | Taylor et al. | |
| 10,637,038 B2 | 4/2020 | Zagars et al. | |
| 10,734,672 B2 | 8/2020 | Chen et al. | |
| 10,777,852 B2 | 9/2020 | Woodford et al. | |
| 10,964,973 B2 * | 3/2021 | Tan .................... | H01M 4/134 |
| 11,005,087 B2 | 5/2021 | Ota et al. | |
| 11,018,365 B2 | 5/2021 | Chiang et al. | |
| 11,024,903 B2 | 6/2021 | Ota et al. | |
| 11,094,487 B2 | 8/2021 | Lawrence et al. | |
| 11,094,976 B2 | 8/2021 | Chiang et al. | |
| 11,121,437 B2 | 9/2021 | Bazzarella et al. | |
| 11,139,467 B2 | 10/2021 | Zagars et al. | |
| 11,394,049 B2 | 7/2022 | Tan et al. | |
| 11,462,722 B2 | 10/2022 | Aranami et al. | |
| 11,469,065 B2 | 10/2022 | Lawrence et al. | |
| 11,476,551 B2 | 10/2022 | Tyler et al. | |
| 11,552,368 B2 | 1/2023 | Holman et al. | |
| 11,575,146 B2 | 2/2023 | Taylor et al. | |
| 11,594,793 B2 | 2/2023 | Bazzarella et al. | |
| 11,611,061 B2 | 3/2023 | Zagars et al. | |
| 11,631,920 B2 | 4/2023 | Bazzarella et al. | |
| 11,646,437 B2 | 5/2023 | Bazzarella et al. | |
| 11,652,203 B2 | 5/2023 | Zagars et al. | |
| 11,749,804 B2 | 9/2023 | Chen et al. | |
| 11,757,129 B2 | 9/2023 | Tan et al. | |
| 11,764,353 B2 | 9/2023 | Ota et al. | |
| 2004/0053134 A1 | 3/2004 | Ozaki et al. | |
| 2005/0102824 A1 | 5/2005 | Shembel et al. | |
| 2010/0047671 A1 * | 2/2010 | Chiang ................ | H01M 8/188 |
| | | | 429/246 |
| 2010/0323264 A1 | 12/2010 | Chiang et al. | |
| 2010/0330410 A1 | 12/2010 | Takahashi et al. | |
| 2011/0189520 A1 | 8/2011 | Carter et al. | |
| 2011/0200848 A1 | 8/2011 | Chiang et al. | |
| 2011/0274948 A1 | 11/2011 | Duduta et al. | |
| 2012/0164499 A1 | 6/2012 | Chiang et al. | |
| 2012/0202112 A1 | 8/2012 | Yushin et al. | |
| 2013/0055559 A1 | 3/2013 | Slocum et al. | |
| 2013/0065122 A1 | 3/2013 | Chiang et al. | |
| 2013/0309547 A1 | 11/2013 | Bazzarella et al. | |
| 2013/0337319 A1 | 12/2013 | Doherty et al. | |
| 2014/0004437 A1 | 1/2014 | Slocum et al. | |
| 2014/0030623 A1 | 1/2014 | Chiang et al. | |
| 2014/0039710 A1 | 2/2014 | Carter et al. | |
| 2014/0154546 A1 | 6/2014 | Carter et al. | |
| 2014/0170524 A1 | 6/2014 | Chiang et al. | |
| 2014/0248521 A1 | 9/2014 | Chiang et al. | |
| 2014/0315097 A1 | 10/2014 | Tan et al. | |
| 2015/0024279 A1 | 1/2015 | Tan et al. | |
| 2015/0129081 A1 | 5/2015 | Chiang et al. | |
| 2015/0140371 A1 | 5/2015 | Slocum et al. | |
| 2015/0171406 A1 | 6/2015 | Bazzarella et al. | |
| 2015/0280267 A1 | 10/2015 | Chiang et al. | |
| 2015/0295272 A1 | 10/2015 | Chiang et al. | |
| 2015/0357626 A1 | 12/2015 | Holman et al. | |
| 2016/0013507 A1 | 1/2016 | Chiang et al. | |
| 2016/0056490 A1 | 2/2016 | Chiang et al. | |
| 2016/0056491 A1 | 2/2016 | Chiang et al. | |
| 2016/0105042 A1 | 4/2016 | Taylor et al. | |
| 2016/0126543 A1 | 5/2016 | Ota et al. | |
| 2016/0133916 A1 | 5/2016 | Zagars et al. | |
| 2016/0190544 A1 | 6/2016 | Slocum et al. | |
| 2016/0218375 A1 | 7/2016 | Chiang et al. | |
| 2016/0268621 A1 | 9/2016 | Chiang et al. | |
| 2016/0308218 A1 | 10/2016 | Ota et al. | |
| 2016/0344006 A1 | 11/2016 | Ota et al. | |
| 2016/0372802 A1 | 12/2016 | Chiang et al. | |
| 2017/0018798 A1 | 1/2017 | Tan et al. | |
| 2017/0025646 A1 | 1/2017 | Ota et al. | |
| 2017/0025674 A1 | 1/2017 | Tan et al. | |
| 2017/0033389 A1 | 2/2017 | Chiang et al. | |
| 2017/0033390 A1 | 2/2017 | Chiang et al. | |

(56) References Cited

U.S. PATENT DOCUMENTS

| | | |
|---|---|---|
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chaing et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2021/0091366 A1 | 3/2021 | Bazzarella et al. |
| 2021/0167351 A1 | 6/2021 | Zagars et al. |
| 2021/0226192 A1 | 7/2021 | Aranami et al. |
| 2021/0249695 A1 | 8/2021 | Aranami et al. |
| 2021/0265631 A1 | 8/2021 | Chen et al. |
| 2022/0021019 A1 | 1/2022 | Tan et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0352597 A1 | 11/2022 | Chen et al. |
| 2023/0018078 A1 | 1/2023 | Slocum et al. |
| 2023/0022329 A1 | 1/2023 | Chen et al. |
| 2023/0090853 A1 | 3/2023 | Tyler et al. |
| 2023/0118961 A1 | 4/2023 | Chen et al. |
| 2023/0133464 A1 | 5/2023 | Ota et al. |
| 2023/0170169 A1 | 6/2023 | Lawrence et al. |
| 2023/0178707 A1 | 6/2023 | Aranami et al. |
| 2023/0282906 A1 | 9/2023 | Chen et al. |
| 2023/0291063 A1 | 9/2023 | Holman et al. |

FOREIGN PATENT DOCUMENTS

| | | | |
|---|---|---|---|
| JP | S6035466 | U | 3/1985 |
| JP | H01183065 | A | 7/1989 |
| JP | 2000012092 | A | 1/2000 |
| JP | 2001035484 | A | 2/2001 |
| JP | 2002231312 | | 8/2002 |
| JP | 2002289261 | | 10/2002 |
| JP | 2003282144 | | 10/2003 |
| JP | 2011258351 | A | 12/2011 |
| JP | 2012099289 | A | 5/2012 |
| JP | 2016511521 | | 4/2016 |
| WO | WO2000057504 | | 9/2000 |
| WO | WO2009151639 | | 12/2009 |
| WO | WO2008059846 | | 3/2010 |
| WO | WO2011084649 | | 7/2011 |
| WO | WO2012064531 | | 5/2012 |
| WO | WO2012083233 | | 6/2012 |
| WO | WO2013036801 | | 3/2013 |
| WO | WO2014150210 | | 9/2014 |

OTHER PUBLICATIONS

Extended European Search Report for European Application No. 14770454.8, mailed Sep. 2, 2016, 10 pages.
Office Action for European Application No. 14770454.8, mailed Sep. 7, 2017, 10 pages.
Notice of Reasons for Rejection for Japanese Application No. 2016-501008, mailed Apr. 2, 2018, 4 pages.
Notice of Reasons for Rejection for Japanese Application No. 2016-501008, mailed Apr. 2, 2019, 7 pages.
Decision of Rejection for Japanese Application No. 2016-501008, mailed Dec. 3, 2019, 7 pages.
Office Action for U.S. Appl. No. 14/202,606, mailed Dec. 15, 2015, 5 pages.
International Search Report and Written Opinion for International Application No. PCT/US2014/022588, mailed Aug. 21, 2014, 9 pages.
International Preliminary Report on Patentability for International Application No. PCT/US2014/022588, dated Sep. 15, 2015, 6 pages.
Extended European Search Report for European Application No. 20151232.4, mailed May 29, 2020, 14 pages.
Office Action for U.S. Appl. No. 15/228,259, mailed Apr. 7, 2017, 8 pages.
Office Action for U.S. Appl. No. 15/792,052, mailed Apr. 29, 2019, 8 pages.
Office Action for U.S. Appl. No. 16/692,206, mailed Oct. 29, 2020, 9 pages.
Notice of Allowance for U.S. Appl. No. 17/182,674, mailed Mar. 21, 2022, 7 pages.
Notice of Reasons for Rejection for Japanese Application No. 2020-067544, mailed Jul. 6, 2023, 6 pages.
Notice of Reasons for Rejection for Japanese Application No. 2022-097290, mailed Aug. 30, 2023, 15 pages.
Decision to Grant for Japanese Application No. 2022-097290 mailed Jul. 26, 2024, 6 pages.

\* cited by examiner

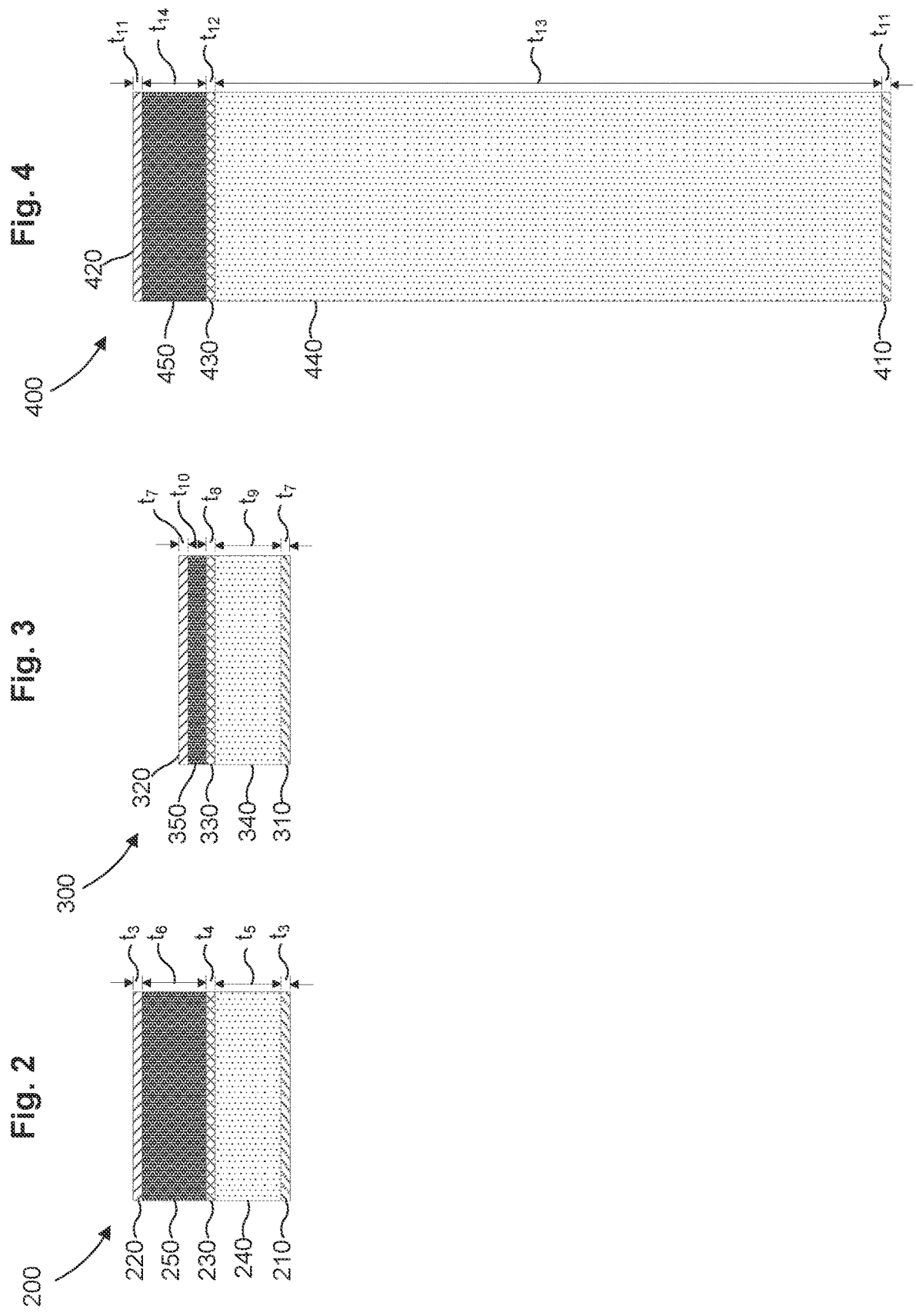

ASYMMETRIC BATTERY HAVING A SEMI-SOLID CATHODE AND HIGH ENERGY DENSITY ANODE

CROSS-REFERENCE TO RELATED APPLICATIONS

This application is a continuation of U.S. patent application Ser. No. 17/182,674, filed Feb. 23, 2021, entitled "Asymmetric Battery Having A Semi-Solid Cathode And High Energy Density Anode," which is a continuation of U.S. patent application Ser. No. 16/692,206, filed Nov. 22, 2019, now U.S. Pat. No. 10,964,973, entitled "Asymmetric Battery Having A Semi-Solid Cathode And High Energy Density Anode," which is a continuation of U.S. patent application Ser. No. 15/792,052, filed Oct. 24, 2017, now U.S. Pat. No. 10,522,870, entitled "Asymmetric Battery Having A Semi-Solid Cathode And High Energy Density Anode," which is a continuation of U.S. patent application Ser. No. 15/228,259, filed Aug. 4, 2016, now U.S. Pat. No. 9,831,522, entitled "Asymmetric Battery Having A Semi-Solid Cathode And High Energy Density Anode," which is a continuation of U.S. patent application Ser. No. 14/202,606, filed Mar. 10, 2014, now U.S. Pat. No. 9,437,864, entitled "Asymmetric Battery Having A Semi-Solid Cathode And High Energy Density Anode," which claims priority to and benefit of U.S. Provisional Application No. 61/787,372, filed Mar. 15, 2013 and entitled "Asymmetric Battery Having a Semi-solid Cathode and High Energy Density Anode", the entire disclosures of which is are hereby incorporated by reference herein in their entirety.

STATEMENT REGARDING FEDERALLY SPONSORED RESEARCH OR DEVELOPMENT

This invention was made with government support under Grant Number DE-AR0000102 awarded by the Department of Energy. The government has certain rights in this invention.

BACKGROUND

Embodiments described herein relate generally to asymmetric batteries having high energy density anodes, and more particularly to devices, systems and methods of producing high energy density batteries having a semi-solid cathode that is thicker than the anode.

Batteries are typically constructed of solid electrodes, separators, electrolyte, and ancillary components such as, for example, packaging, thermal management, cell balancing, consolidation of electrical current carriers into terminals, and/or other such components. These conventional battery manufacturing methods generally involve complicated and expensive manufacturing steps, such as casting the electrode, and are only suitable for electrodes of limited thickness, e.g., typically less than 100 µm. These known methods for producing electrodes of limited thickness result in batteries with lower capacity, lower energy density, and a high ratio of inactive components to active material. Said another way, the non-energy storage elements of the finished device, that is the separator and current collector, comprise a relatively high fixed volume or mass fraction of the device, thereby decreasing the device's overall energy density.

Thus, it is an enduring goal of energy storage systems development to simplify and reduce manufacturing cost, reduce inactive components in the electrodes and finished batteries, and increase energy density and overall performance.

SUMMARY

Embodiments described herein relate generally to devices, systems and methods of producing high energy density batteries having a semi-solid cathode that is thicker than the anode. In some embodiments, an electrochemical cell can include a positive electrode current collector, a negative electrode current collector and an ion-permeable membrane disposed between the positive electrode current collector and the negative electrode current collector. The ion-permeable membrane is spaced a first distance from the positive electrode current collector and at least partially defines a positive electroactive zone. The ion-permeable membrane is spaced a second distance from the negative electrode current collector and at least partially defines a negative electroactive zone. The second distance is less than the first distance. A semi-solid cathode that includes a suspension of an active material and a conductive material in a non-aqueous liquid electrolyte is disposed in the positive electroactive zone, and an anode is disposed in the negative electroactive zone.

BRIEF DESCRIPTION OF THE DRAWINGS

FIG. 2 is a schematic illustration of a symmetric electrochemical cell, according to an embodiment.

FIG. 3 is a schematic illustration of an asymmetric electrochemical cell, according to an embodiment.

FIG. 4 is a schematic illustration of an asymmetric electrochemical cell, according to an embodiment.

DETAILED DESCRIPTION

Figure 1:
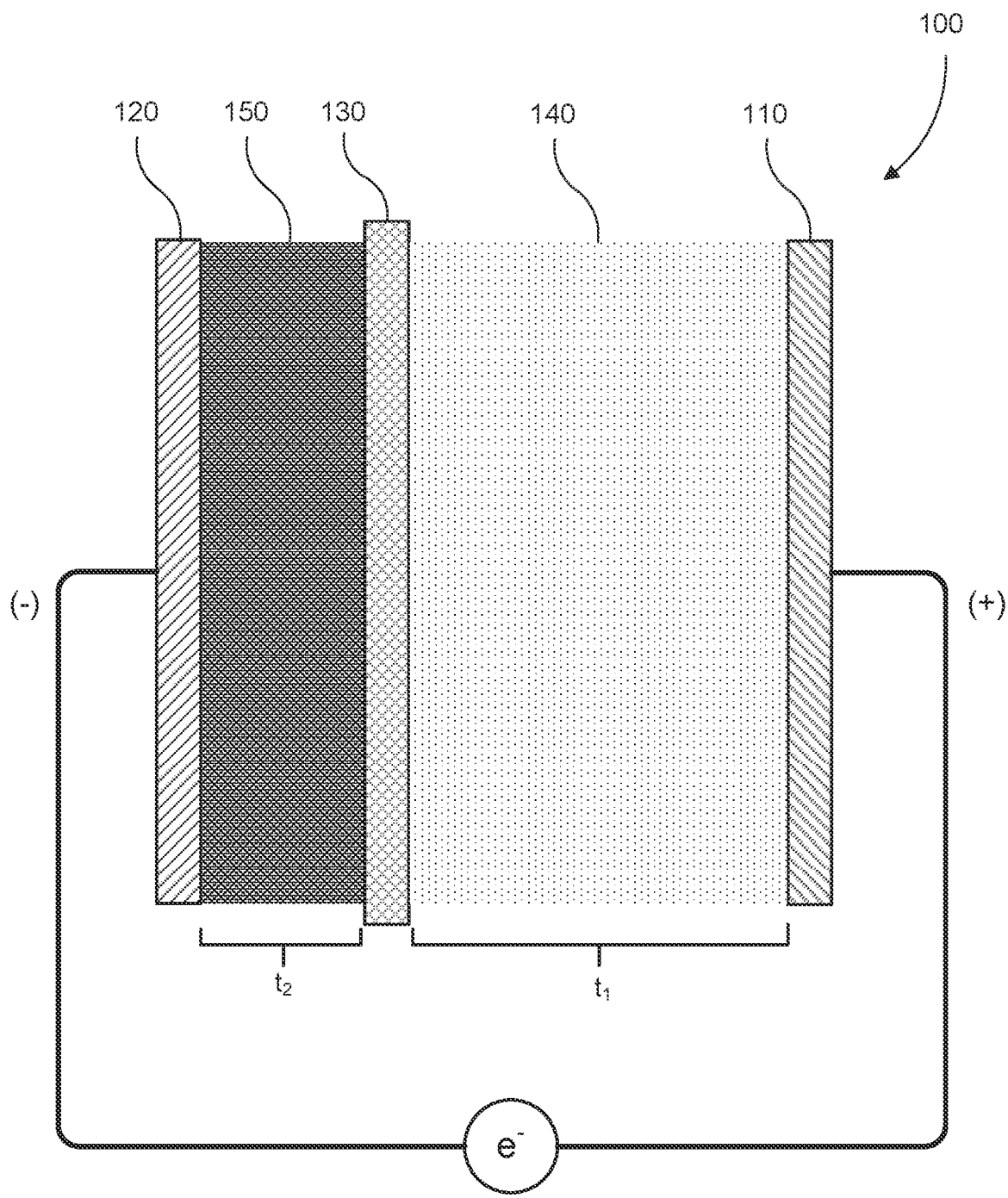
FIG. 1 is a schematic illustration of an electrochemical cell according to an embodiment.

Embodiments described herein relate generally to devices, systems and methods of producing high energy density batteries having a semi-solid cathode that is thicker than the anode. In some embodiments, an electrochemical cell can include a positive electrode current collector, a negative electrode current collector and an ion-permeable membrane disposed between the positive electrode current collector and the negative electrode current collector. The ion-permeable membrane is spaced a first distance from the positive electrode current collector and at least partially defines a positive electroactive zone. The ion-permeable membrane is spaced a second distance from the negative electrode current collector and at least partially defines a negative electroactive zone. The second distance is less than the first distance. A semi-solid cathode that includes a suspension of an active material and a conductive material in a non-aqueous liquid electrolyte is disposed in the positive electroactive zone, and an anode is disposed in the negative electroactive zone.

Consumer electronic batteries have gradually increased in energy density with the progress of lithium-ion battery technology. The stored energy or charge capacity of a manufactured battery is a function of: (1) the inherent charge capacity of the active material (mAh/g), (2) the volume of the electrodes ($cm^3$) (i.e., the product of the electrode thickness, electrode area, and number of layers (stacks)), and (3) the loading of active material in the electrode media (e.g., grams of active material per cm of electrode media).

Therefore, to enhance commercial appeal (e.g., increased energy density and decreased cost), it is generally desirable to increase the areal charge capacity (mAh/cm$^2$) The areal charge capacity can be increased, for example, by utilizing active materials that have a higher inherent charge capacity, increasing relative percentage of active charge storing material (i.e., "loading") in the overall electrode formulation, and/or increasing the relative percentage of electrode material used in any given battery form factor. Said another way, increasing the ratio of active charge storing components (e.g., the electrodes) to inactive components (e.g., the separators and current collectors), increases the overall energy density of the battery by eliminating or reducing components that are not contributing to the overall performance of the battery. One way to accomplish increasing the areal charge capacity, and therefore reducing the relative percentage of inactive components, is by increasing the thickness of the electrodes.

In some embodiments, higher energy densities and capacities can be achieved by, for example, improvements in the materials used in the anode and/or cathode, and/or increasing the thickness of the anode/cathode (i.e., higher ratio of active materials to inactive materials). One of the latest materials used in the anode for consumer electronics is, for example, silicon (Si), tin (Sn), silicon alloys, or tin alloys due to their high capacity and low voltage. Typically, this high capacity active material is mixed with graphite due to its high first charge capacity and related first charge irreversible capacity. Silicon has a first charge theoretical capacity of 4,200 mAh/g and an irreversible capacity of more than 300 mAh/g. Therefore, typical anodes that utilize Si contain a mixture of silicon and graphite in order to reduce the irreversible capacity. In addition, silicon undergoes a very large volume change during lithium insertion causing the volume of the material to grow by more than 300%. To limit this large volumetric expansion, current high capacity anodes utilize between 10-20% silicon in the anode mixture resulting in anodes with overall capacity of about 700 to about 4,200 mAh/g.

Conventional cathode compositions have capacities of approximately 150-200 mAh/g and cannot be made thicker than 200 m because conventional electrodes manufactured using the high speed roll-to-roll calendering process tend to delaminate from the flat current collectors if they are made thicker than about 200 µm. Additionally, thicker electrodes have higher cell impedance, which reduces energy efficiency (e.g., as described in Yu et al "Effect of electrode parameters on LiFePO$_4$ cathodes", *J. Electrochem. Soc.* Vol. 153, A835-A839 (2006)). Therefore, to match the high capacity anodes with the conventional cathodes, current state-of-the-art batteries have focused on reducing the thickness of the anode. For example, anodes having a thickness of about 40-50 µm and even thinner are being developed. Such thin coatings of these anode materials begin to approach the thickness level of a single graphite particle. The limitation of thickness and associated loading density in conventional coating processes has prevented development of batteries that take full advantage of the high capacity that is available in high energy anodes.

Semi-solid cathodes described herein can be made: (i) thicker (e.g., greater than 200 µm-up to 2,000 µm or even greater) due to the reduced tortuosity and higher electronic conductivity of the semi-solid electrode, (ii) with higher loadings of active materials, and (iii) with a simplified manufacturing process utilizing less equipment, thereby decreasing the volume, mass and cost contributions of inactive components with respect to active components.

Examples of semi-solids cathodes having a thickness greater that 200 µm without an adverse affect on impedance, energy efficiency, energy density or capacity are described in U.S. Provisional Patent Application No. 61,787,382 filed Mar. 15, 2013, entitled "Semi-Solid Electrodes Having High Rate Capability," the disclosure of which is hereby incorporated by reference. Examples of systems and methods that can be used for preparing the semi-solid compositions and/or electrodes are described in U.S. patent application Ser. No. 13/832,861 filed Mar. 15, 2013, entitled "Electrochemical Slurry Compositions and Methods for Preparing the Same," the entire disclosure of which is hereby incorporated by reference.

Since the semi-solid cathodes can be much thicker than conventional electrodes (e.g., greater than 200 µm), and with higher loading densities, the semi-solid cathode can be more effectively paired with high energy anodes. Said another way, the thicker semi-solid cathode enables active material loading densities that are three, four, five, or more times higher than conventional coated electrodes. The thicker semi-solid cathodes with higher loading densities can be paired with anodes that utilize silicon, tin, or other high energy anode materials without having to maintain a thin anode and/or loading density. The high capacity anodes can be made with conventional coating methods and have higher loading density that approach the maximum active material loading density of conventional electrodes that utilize binder and as a result, still be matched/balanced with the cathode. The pairing of the semi-solid cathode with the high capacity anode can result in cells with volumetric energy densities that are greater than 600 Wh/L or greater. In some embodiments, the anode can be a semi-solid anode made with high energy anode materials in a similar fashion as described with respect to the semi-solid cathode.

In some embodiments, the electrode materials described herein can be a flowable semi-solid or condensed liquid composition. A flowable semi-solid electrode can include a suspension of an electrochemically active material (anodic particles or particulates), and optionally an electronically conductive material (e.g., carbon) in a non-aqueous liquid electrolyte. Said another way, the active electrode particles and conductive particles are co-suspended in an electrolyte to produce a semi-solid electrode. The anode includes a high energy anode material e.g., silicon, tin, aluminum, titanium oxide or any other high capacity material, alloys or combination thereof. In some embodiments, the anode can be formed using a conventional coating/calendering process. In some embodiments, the anode can be a semi-solid anode that includes high energy anodic particles and carbon (e.g. graphite) particles co-suspended in an electrolyte to produce a semi-solid anode. Examples of battery architectures utilizing semi-solid suspensions are described in international Patent Publication No. WO 2012/024499, entitled "Stationary, Fluid Redox Electrode," and International Patent Publication No. WO 2012/088442, entitled "Semi-Solid Filled Battery and Method of Manufacture," the entire disclosures of which are hereby incorporated by reference.

As used herein, the term "about" and "approximately" generally mean plus or minus 10% of the value stated. e.g., about 250 µm would include 225 µm to 275 µm, about 1,000 µm would include 900 µm to 1,100 µm.

As used herein, the term "semi-solid" refers to a material that is a mixture of liquid and solid phases, for example, such as particle suspension, colloidal suspension, emulsion, gel, or micelle.

As used herein, the term "condensed ion-storing liquid" or "condensed liquid" refers to a liquid that is not merely a solvent, as in the case of an aqueous flow cell semi-solid cathode or anode, but rather, it is itself redox active. Of course, such a liquid form may also be diluted by or mixed with another, non-redox active liquid that is a diluent or solvent, including mixing with such a diluent to form a lower-melting liquid phase, emulsion or micelles including the ion-storing liquid.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

As used herein, the term "volumetric energy density" refers to the amount of energy (e.g., Wh) stored in an electrochemical cell per unit volume (e.g., L) of the materials required for the electrochemical cell to operate such as, the electrodes, the separator, the electrolyte, and the current collectors. Specifically, the materials used for packaging the electrochemical cell are excluded from the calculation of volumetric energy density.

In some embodiments, an electrochemical cell for storing energy includes a positive electrode current collector, a negative electrode current collector and an ion-permeable membrane disposed between the positive electrode current collector and the negative electrode current collector. The ion-permeable membrane is spaced a first distance from the positive electrode current collector and at least partially defines a positive electroactive zone. The ion-permeable membrane is spaced a second distance from the negative electrode current collector and at least partially defines a negative electroactive zone. The second distance is less than the first distance. A semi-solid cathode that includes a suspension of an active material and a conductive material in a non-aqueous liquid electrolyte is disposed in the positive electroactive zone, and an anode is disposed in the negative electroactive zone. In some embodiments, the anode can be a semi-solid anode that includes a suspension of a high capacity active material and a carbon material in a non-aqueous liquid electrolyte.

In some embodiments, the anode includes at least one high capacity anode material selected from silicon, bismuth, boron, gallium, indium, zinc, tin, antimony, aluminum, titanium oxide, molybdenum, germanium, manganese, niobium, vanadium, tantalum, iron, copper, gold, platinum, chromium, nickel, cobalt, zirconium, yttrium, molybdenum oxide, germanium oxide, silicon oxide, silicon carbide, any other high capacity materials or alloys thereof, and any combination thereof.

In some embodiments, the first distance is at least about 250 µm. In some embodiments, the first distance is about 300 µm, about 350 µm, about 400 µm, about 450 µm, about 500 µm, about 600 µm, about 700 µm, about 800 µm, about 900 µm, about 1,000 µm, about 1,500 µm, and up to about 2,000 µm, inclusive of all thicknesses therebetween.

In some embodiments, the first distance is in the range of about 250 µm to about 2,000 µm, about 300 µm to about 2,000 µm, about 350 µm to about 2,000 µm, 400 µm to about 2,000 µm, about 450 µm to about 2,000 µm, about 500 to about 2,000 µm, about 250 µm to about 1,500 µm, about 300 µm to about 1,500 µm, about 350 µm to about 1,500 µm, about 400 µm to about 1,500 µm, about 450 µm to about 1,500 µm, about 500 to about 1,500 µm, about 250 µm to about 1,000 µm, about 300 µm to about 1,000 µm, about 350 µm to about 1,000 µm, about 400 µm to about 1,000 µm, about 450 µm to about 1,000 µm, about 500 µm to about 1,000 µm, about 250 µm to about 750 µm, about 300 µm to about 750 µm, about 350 µm to about 750 µm, about 400 µm to about 750 µm, about 450 µm to about 750 µm, about 500 µm to about 750 µm, about 250 µm to about 700 µm, about 300 µm to about 700 µm, about 350 µm to about 700 µm, about 400 µm to about 700 µm, about 450 µm to about 700 µm, about 500 µm to about 700 µm, about 250 µm to about 650 µm, about 300 µm to about 650 µm, about 350 µm to about 650 µm, about 400 µm to about 650 µm, about 450 µm to about 650 µm, about 500 µm to about 650 µm, about 250 µm to about 600 µm, about 300 µm to about 600 µm, about 350 µm to about 600 µm, about 400 µm to about 600 µm, about 450 µm to about 600 µm, about 500 µm to about 600 µm, about 250 µm to about 550 µm, about 300 µm to about 550 µm, about 350 µm to about 550 µm, about 400 µm to about 550 µm, about 450 µm to about 550 µm, or about 500 µm to about 550 µm, inclusive of all ranges or any other distance therebetween.

In some embodiments, the second distance is in the range of about 30 µm to about 200 µm, about 40 µm to about 200 µm, about 50 µm to about 200 µm, about 60 µm to about 200 µm, about 70 µm to about 200 µm, about 100 µm to about 200 µm, about 150 µm to about 200 µm, about 200 µm to about 300 µm, about 200 µm to about 400 µm, about 200 µm to about 500 µm, inclusive of all ranges or any other distance therebetween.

In some embodiments, the anode can include about 66 wt %-70 wt % Si, about 15 wt %-22 wt % Co, and about 4 wt %-12 wt % C. In some embodiments, the anode can include about 70 wt % Si, about 15 wt %-20 wt % Ni and about 10 wt %-15 wt % C. In some embodiments, the anode can include about 70 wt % Si, about 15 wt % Fe and about 15 wt % C. In some embodiments, the anode can include about 70 wt % Si, about 20 wt % Ti, and about 10 wt % C. In some embodiments, the anode can include about 70 wt % Si, about 15 wt % Mo and about 15 wt % C. In some embodiments, the anode can include about 70 wt %, Si, 15 wt % Co, 5 wt % Ni and about 10 wt % C. In some embodiments, the anode can include about 70 wt % Si, about 10 wt % Cc, about 10 wt % Ni and about 10 wt % C. In some embodiments, the anode can include about 70 wt % Si, about 5 wt % Co, about 15 wt % Ni and about 10 wt % C. In some embodiments, the anode can include about 70 wt % Si, about 5 wt % Fe, about 10 wt % Ni and about IS wt % C. In some embodiments, the anode can include about 70 wt % Si, 10 wt % Co and about 5 wt % Ni. In some embodiments, the anode can include about 74 wt % Si, 2 wt % Sn and about 24 wt % Co. In some embodiments, the anode can include about 73 wt % Si, about 2 wt % Sn and about 25 wt % Ni. In some embodiments, the anode can include about 70 wt % Si, 10 wt % Fe, about 10 wt % Ti and about 10 wt % Co. In some embodiments, the anode can include about 70 wt % Si, about 15 wt % Fe, about 5 wt % Ti and about 10 wt % C. In some embodiments, the anode can include about 74.67 wt % Si, 16 wt % Fe, 5.33 wt % Ti and 4 wt % C. In some embodiments, the anode can include about 55 wt % Si, 29.3 wt % Al and about 15.7 wt % Fe. In some embodiments, the anode can include about 70 wt % Si, about 20 wt % C from a precursor and about 10 wt % graphite by weight. In some embodiments, the anode can include about 55 wt % Si, about 29.3 wt % Al and about 15.7 wt % Fe. In some embodiments, the anode can include about 60-62 wt % Si, about 16-20 wt % Al, about 12-14 wt % Fe, and about 8% Ti. In some embodiments, the anode can include about 50 wt % Sn, about 27.3 wt %-35.1 wt % Co, about 5 wt %-15 wt % Ti, and about 7.7 wt %-9.9 wt % C. In some embodiments, the anode can include about 50 wt % Sn, about 39-42.3 wt % Co, and about 7.7-11 wt % C. In some embodiments, the anode can include about 35-70 mole % Si, about 1-45 mole % Al, about 5-25 mole % transition metal, about 1-15 mole % Sn, about 2-15 mole % yttrium, a lanthanide element, an actinide element or a combination thereof.

In some embodiments, the anode can include a tin metal alloy such as, for example, a Sn—Co—C, a Sn—Fe—C, a Sn—Mg—C, or a La—Ni—Sn alloy. In some embodiments, the anode can include an amorphous oxide such as, for example, SnO or SiO amorphous oxide. In some embodiments, the anode can include a glassy anode such as, for example, a Sn—Si—Al—B—O, a Sn—Sb—S—O, a $SnO_2$—$P_2O_5$, or a SnO—$B_2O$—$P_2O_5$—$Al_2O_3$ anode. In some embodiments, the anode can include a metal oxide such as, for example, a CoO, a $SnO_2$, or a $V_2O_5$. In some embodiments, the anode can include a metal nitride such as, for example, $Li_3N$ or $Li_3.6CoO.4N$.

In some embodiments, the anode can be single layer anode that includes all components of the anode (e.g., active material, conductive material, electrolyte, and high capacity layer) mixed together in the layer. In some embodiments, the anode can include a multi-layer structure, for example, a multiple layers of high capacity anode materials combined with carbon materials.

In some embodiments, an electrochemical cell includes a semi-solid cathode including a suspension of an active material and a conductive material in a non-aqueous liquid electrolyte, the semi-solid cathode having a capacity of about 150-200 mAh/g and a thickness in the range of about 250 μm to about 2,000 μm, and an anode that has a capacity in the range of about 700-1,200 mAh/g and a thickness in the range of about 30 μm to about 600 μm. The anode and semi-solid cathode are separated by a separator disposed therebetween.

In some embodiments, the anode includes an anode active material selected from lithium metal, carbon, lithium-intercalated carbon, lithium nitrides, lithium alloys and lithium alloy forming compounds of silicon, bismuth, boron, gallium, indium, zinc, tin, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon oxide, silicon carbide, any other high capacity materials or alloys thereof, and any other combination thereof. In some embodiments, the anode active material can include silicon and/or alloys thereof. In some embodiments, anode active material can include tin and/or alloys thereof.

In some embodiments, the thickness of the cathode can be in the range of about 2 times to about 6 times the thickness of the anode. In some embodiments, the thickness of the cathode can be in the range of about 2 to about 5, about 2 to about 4, about 2 to about 3, about 3 to about 6, about 4 to about 6, or about 5 to about 6 times the thickness of the anode.

In some embodiments, a semi-solid cathode can include about 20% to about 75% by volume of an active material. In some embodiments, a semi-solid cathode can include about 40% to about 75% by volume, or 60% to about 75% by volume of an active material.

In some embodiments, a semi-solid cathode can include about 0.5% to about 25% by volume of a conductive material. In some embodiments, a semi-solid cathode can include about 1.0% to about 6% by volume of a conductive material.

In some embodiments, a semi-solid cathode can include about 25% to about 70% by volume of an electrolyte. In some embodiments, a semi-solid cathode can include about 30% to about 50%, or about 20% to about 40% by volume of an electrolyte.

In some embodiments, the anode is a solid anode formed on a negative electrode current collector. In some embodiments, the anode is a semi-solid anode that includes about 50% to about 75% by volume of a carbonaceous active material, about 1% to about 10% by volume of a high energy capacity anode material, about 0.5% to about 2% by volume of a conductive material, and about 20% to about 40% by volume of an non-aqueous liquid electrolyte. In some embodiments, the high capacity anode material includes at least one high capacity anode material selected from silicon, silicon alloys, tin, tin alloys, aluminum and titanium oxide.

In some embodiments, a semi-solid anode can include about 0% to about 75% by volume of an active material. In some embodiments, a semi-solid anode can include about 40% to about 75% by volume, or about 50% to about 75% by volume of an active material.

In some embodiments, a semi-solid anode can include about 0% to about 75% by volume of a high energy capacity material. In some embodiments, a semi-solid anode can include about 1% to about 30% by volume, about 1% to about 20% by volume, about 1% to about 10% by volume, or about 1% to about 5% of a high energy capacity material.

In some embodiments, a semi-solid anode can include about 0% to about 10% by volume of a conductive material. In some embodiments, a semi-solid anode can include about 1% to about 6%, or about 0.5% to about 2% by volume of a conductive material.

In some embodiments, a semi-solid anode can include about 10% to about 70% by volume of an electrolyte. In some embodiments, a semi-solid anode can include about 30% to about 50%, or about 20% to about 40% by volume of an electrolyte.

In some embodiments, an electrochemical cell including a semi-solid cathode and a high energy anode can have a volumetric energy density that is greater than about 600 Wh/L, greater than about 700 Wh/L, greater than about 800 Wh/L, greater than about 900 Wh/L, greater than about 1,000 Wh/L, greater than about 1,100 Wh/L, and up to about 1,200 Wh/L.

In some embodiments, an electrochemical cell can include an anode, a semi-solid cathode material that includes about 60% to about 80% by weight of an active material, about 1% to about 6% by weight of a conductive material, and about 20% to about 40% by weight of a non-aqueous liquid electrolyte. A separator is disposed between the anode and the semi-solid cathode such that the thickness of the cathode is at least about two times the thickness of the anode. In some embodiments, the thickness of the cathode is at least about three times the thickness of the anode. In some embodiments, the thickness of the cathode is at least about four times the thickness of the anode. In some embodiments, the thickness of the cathode is at least about five times the thickness of the anode.

In some embodiments, an electrochemical cell includes a semi-solid cathode that can include about 60% to about 80% by weight of an active material, about 1% to about 6% by weight of a conductive material, and about 20% to about 40% by weight of a non-aqueous liquid electrolyte. The semi solid cathode can have a thickness in the range of about 250

μm to about 2,000 μm. The electrochemical cell also includes an anode that can include a high charge capacity material and can have an overall capacity in the range of about 700 mAh/g to about 1,200 mAh/g. The anode can have a thickness in the range of about 20% to about 25% of the cathode thickness. The anode and semi-solid cathode are separated by a separator disposed therebetween.

In some embodiments, a method of manufacturing an electrochemical cell includes transferring an anode semi-solid suspension to a negative electroactive zone defined at least in part by an anode current collector and an ion-permeable membrane spaced apart from the anode collector. The method also includes transferring a cathode semi-solid suspension to a positive electroactive zone defined at least in part by a cathode current collector and an ion-permeable membrane spaced apart from the cathode current collector. The transferring of the anode semi-solid suspension to the anode compartment and the cathode semi-solid suspension to the cathode compartment can be performed such that a difference between a minimum distance and a maximum distance between the anode current collector and the ion permeable membrane is maintained within a predetermined tolerance. Furthermore, the thickness of positive electroactive zone is substantially greater than the thickness of the negative electroactive zone. In some embodiments, the positive electroactive zone can be about two fold, three fold, four fold or five fold thicker than the negative electroactive zone. The method further includes sealing the negative electroactive zone and the positive electroactive zone.

In some embodiments, a method of manufacturing an electrochemical cell includes disposing an injection nozzle in an electrode that is defined, at least in part by a current collector and an ion-permeable membrane. A semi-solid cathode material is transferred to the electroactive zone through the injection nozzle. The injection nozzle is then withdrawn from the electrode compartment during at least a portion of the transferring and then the electrode compartment is sealed.

FIG. 1 shows a schematic illustration of an electrochemical cell 100 for storing energy with high capacity. The electrochemical cell 100 includes a positive current collector 110, a negative current collector 120 and a separator 130 disposed between the positive current collector 110 and the negative current collector 120. The positive current collector 110 is spaced a first distance $t_1$ from the separator 130 and at least partially defines a positive electroactive zone. The negative current collector 120 is spaced a second distance $t_2$ from the separator 130 and at least partially defines a negative electroactive zone. The first distance ti is substantially greater than $t_2$. A semi-solid cathode 140 is disposed in the positive electroactive zone and an anode 150 is disposed in the negative electroactive zone, such that the first distance $t_1$ defines thickness of the cathode 140 and the second distance $t_2$ defines the thickness of the anode 150.

The positive current collector 110 and the negative current collector 120 can be any current collectors that are electronically conductive and are electrochemically inactive under the operation conditions of the cell. Typical current collectors for lithium cells include copper, aluminum, or titanium for the negative current collector and aluminum for the positive current collector, in the form of sheets or mesh, or any combination thereof.

Current collector materials can be selected to be stable at the operating potentials of the positive and negative electrodes of the electrochemical cell 100. For example, in non-aqueous lithium systems, the positive current collector can include aluminum, or aluminum coated with conductive material that does not electrochemically dissolve at operating potentials of 2.5-5.0V with respect to $Li/Li^+$. Such materials include platinum, gold, nickel, conductive metal oxides such as vanadium oxide, and carbon. The negative current collector can include copper or other metals that do not form alloys or intermetallic compounds with lithium, carbon, and/or coatings comprising such materials disposed on another conductor.

The separator 130 can be any suitable separator that acts as an ion-permeable membrane, i.e. allows exchange of ions while maintaining physical separation of the cathode 140 and anode 150 compositions. For example, the separator 130 can be any conventional membrane that is capable of ion transport. In some embodiments, the separator 130 is a liquid impermeable membrane that permits the transport of ions therethrough, namely a solid or gel ionic conductor. In some embodiments the separator 130 is a porous polymer membrane infused with a liquid electrolyte that allows for the shuttling of ions between the cathode 140 and anode 151 electroactive materials, while preventing the transfer of electrons. In some embodiments, the separator 130 is a microporous membrane that prevents particles forming the positive and negative electrode compositions from crossing the membrane. For example, the membrane materials can be selected from polyethyleneoxide (PEO) polymer in which a lithium salt is complexed to provide lithium conductivity, or Nation™ membranes which are proton conductors. For example, PEO based electrolytes can be used as the membrane, which is pinhole-free and a solid ionic conductor, optionally stabilized with other membranes such as glass fiber separators as supporting layers. PEO can also be used as a slurry stabilizer, dispersant, etc. in the positive or negative redox compositions. PEO is stable in contact with typical alkyl carbonate-based electrolytes. This can be especially useful in phosphate-based cell chemistries with cell potential at the positive electrode that is less than about 3.6 V with respect to Li metal. The operating temperature of the redox cell can be elevated as necessary to improve the ionic conductivity of the membrane.

The cathode 140 can be a semi-solid stationary cathode or a semi-solid flowable cathode, for example of the type used in redox flow cells. The cathode 140 can include an active material such as a lithium bearing compound as described in further detail below. The cathode 140 can also include a conductive material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls," graphene sheets and/or aggregate of graphene sheets, any other conductive material, alloys or combination thereof. The cathode 140 can also include a non-aqueous liquid electrolyte as described in further detail below.

In some embodiments, the semi-solid cathode 140 can include about 20%-75% by volume of an active material, about 0.5%-25% by volume of a conductive material and about 25%-70% by volume of an electrolyte. In some embodiments, the semi-solid cathode 140 can include about 60% to about 80% by weight of an active material, about 1% to about 6% by weight of a conductive material, and about 20% to about 40% by weight of a non-aqueous liquid electrolyte.

In some embodiments, the thickness $t_1$ of the cathode 140 can be in the range of about two times to about six times the thickness $t_2$ of the anode 150. In some embodiments, the thickness $t_1$ of the cathode 140 can be about two times the thickness $t_2$ of the anode ISO. In some embodiments, the thickness $t_1$ of the cathode 140 can be about three times the thickness $t_2$ of the anode 150. In some embodiments, the thickness $t_1$ of the cathode 140 can be about four times the thickness $t_2$ of the anode 150. In some embodiments, the thickness $t_1$ of the cathode 140 can be about five times the thickness $t_2$ of the anode 150. In some embodiments, the thickness $t_1$ of the cathode 140 can be about six times the thickness $t_2$ of the anode 150.

The anode 150 can be a conventional anode, e.g., formed through a conventional coating and calendering process. In some embodiments, the anode ISO can be a semi-solid stationary anode. In some embodiments, the anode 150 can be a semi-solid flowable anode, e.g., of the type used in redox flow cells. The anode 150 is a high capacity anode that includes high capacity active materials, e.g., silicon, bismuth, boron, gallium, indium, zinc, tin, antimony, aluminum, titanium oxide, molybdenum, germanium, manganese, niobium, vanadium, tantalum, iron, copper, chromium, nickel, cobalt, zirconium, yttrium, molybdenum oxide, germanium oxide, silicon oxide, silicon carbide, any other high capacity materials or alloys thereof, or any other combination thereof.

The anode 150 can also include a carbonaceous material such as, e.g., graphite, carbon powder, pyrolytic carbon, carbon black, carbon fibers, carbon microfibers, carbon nanotubes (CNTs), single walled CNTs, multi walled CNTs, fullerene carbons including "bucky balls", graphene sheets and/or aggregate of graphene sheets, any other carbonaceous material or combination thereof. In some embodiments, the anode 150 can also include a non-aqueous liquid electrolyte as described in further detail below.

In some embodiments, the thickness $t_2$ of anode 150 can be about 20-25% of the thickness $t_1$ of the cathode 140. In some embodiments, the thickness $t_2$ of the anode 150 can be in the range of about 30 μm to about 600 μm, about 40 μm to about 600 μm, about 50 μm to about 600 μm, about 70 μm to about 600 μm, about 100 μm to about 600 μm, about 150 μm to about 600 μm, about 200 μm to about 600 μm, about 50 μm to about 500 μm, about 100 μm to about 500 μm, about 150 μm to about 500 μm, about 200 μm to about 500 μm, about 100 μm to about 400 μm, about 150 μm to about 400 μm, about 200 μm to about 400 μm, about 100 μm to about 300 μm, about 150 μm to about 300 μm, about 200 μm to about 300 μm, about 30 μm to about 200 μm, about 40 μm to about 200 μm, about 50 μm to about 200 μm, about 60 μm to about 200 μm, about 70 μm to about 200 μm, about 100 μm to about 200 μm, about 150 μm to about 200 μm, about 200 μm, about 300 μm, inclusive of any other thickness or thickness range therebetween.

In some embodiments, the cathode 140 and the anode 150 can both include semi-solid suspensions. In such embodiments, the cathode 140 and the anode 150 can include active materials and optionally conductive materials in particulate form suspended in a non-aqueous liquid electrolyte. In some embodiments, the cathode 140 and/or anode 150 particles have an effective diameter of at least about 1 μm. In some embodiments, the cathode 140 and/or anode 150 particles have an effective diameter between about 1 μm and about 10 μm. In other embodiments, the cathode 140 and/or anode 150 particles have an effective diameter of at least about 10 μm or more.

In some embodiments, a redox mediator is used to improve the charge transfer within the semi-solid suspension. In some embodiments, the redox mediator is based on $Fe^{2+}$ or $V^{2+}$, $V^{3+}$, or $V^{4+}$. In some embodiments, the redox mediator is ferrocene.

In some embodiments, the conductive particles have shapes, which may include spheres, platelets, or rods to optimize solids packing fraction, increase the semi-solid's net electronic conductivity, and improve rheological behavior of semi-solids. Low aspect or substantially equiaxed particles tend to flow well, however, they tend to have a low packing density.

In some embodiments, the particles have a plurality of sizes so as to increase packing fraction by placing smaller particles in the interstices of the larger particles. In particular, the particle size distribution can be biomodal, in which the average particle size of the larger particle mode is at least 5 times larger than average particle size of the smaller particle mode. The mixture of large and small particles improves flow of the material during cell loading and increases solid volume fraction and packing density in the loaded cell.

In some embodiments, the nature of cathode 140 and/or anode 150 semi-solid suspension can be modified prior to and subsequent to filling of the negative electroactive zone and the positive electroactive zone to facilitate flow during loading and packing density in the loaded cell.

In some embodiments, the particle suspension is initially stabilized by repulsive interparticle steric forces that arise from surfactant molecules. After the particle suspension is loaded into the positive electroactive zone and/or the negative electroactive zone, chemical or heat treatments can cause these surface molecules to collapse or evaporate and promote densification. In some embodiments, the suspension's steric forces are modified intermittently during loading.

For example, the particle suspension can be initially stabilized by repulsive interparticle electrostatic double layer forces to decrease viscosity. The repulsive force reduces interparticle attraction and reduces agglomeration. After the particle suspension is loaded into the positive electroactive zone and/or negative electroactive zone, the surface of the particles can be further modified to reduce interparticle repulsive forces and thereby promote particle attraction and packing. For example, ionic solutions such as salt solutions can be added to the suspension to reduce the repulsive forces and promote aggregation and densification so as to produce increased solids fraction loading after filling of the electroactive zones. In some embodiments, salt is added intermittently during suspension loading to increase density in incremental layers.

In some embodiments, the positive and/or negative electroactive zones are loaded with a particle suspension that is stabilized by repulsive forces between particles induced by an electrostatic double layer or short-range steric forces due to added surfactants or dispersants. Following loading, the particle suspension is aggregated and densified by increasing the salt concentration of the suspension. In some embodiments, the salt that is added to is a salt of a working ion for the battery (e.g., a lithium salt for a lithium ion battery) and upon being added, causes the liquid phase to become an ion-conducting electrolyte (e.g., for a lithium rechargeable battery, may be one or more alkyl carbonates, or one or more ionic liquids). Upon increasing the salt concentration, the electrical double layer causing repulsion between the particles is "collapsed", and attractive interactions cause the particle to floc, aggregate, consolidate, or otherwise densify. This allows the electrode of the battery to be formed from the suspension while it has a low viscosity, for example, by pouring, injection, or pumping into the positive and/or negative electroactive zones that can form a net-shaped electrode, and then allows particles within the suspension to be consolidated for improved electrical conduction, higher packing density and longer shelf life.

In some embodiments, the flowable cathode 140 and/or anode 150 semi-solid suspension is caused to become non-flowable by "fixing". In some embodiments, fixing can be performed by the action of photopolymerization. In some embodiments, fixing is performed by action of electromagnetic radiation with wavelengths that are transmitted by the unfilled positive and/or negative electroactive zones of the electrochemical cell 100. In some embodiments, one or more additives are added to the semi-solid suspensions to facilitate fixing.

In some embodiments, the injectable and flowable cathode 140 and/or anode 15 semi-solid is caused to become non-flowable by "plasticizing". In some embodiments, the rheological properties of the injectable and flowable semi-solid suspension are modified by the addition of a thinner, a thickener, and/or a plasticizing agent. In some embodiments, these agents promote processability and help retain compositional uniformity of the semi-solid under flowing conditions and positive and negative electroactive zone filling operations. In some embodiments, one or more additives are added to the flowable semi-solid suspension to adjust its flow properties to accommodate processing requirements.

Semi-Solid Composition

In some embodiments, the cathode 140 and in some embodiments, the anode 150 semi-solids provide a means to produce a substance that functions collectively as an ion-storage/ion-source, electron conductor, and ionic conductor in a single medium that acts as a working electrode.

The cathode 140 and/or anode 150 semi-solid ion-storing redox composition as described herein can have, when taken in moles per liter (molarity), at least 10 M concentration of redox species. In some embodiments, the cathode 140 and/or the anode 150 semi-solids ion-storing redox composition can have at least 12 M, at least 15 M, or at least 20 M. The electrochemically active material can be an ion storage material and or any other compound or ion complex that is capable of undergoing Faradaic reaction in order to store energy. The electroactive material can also be a multiphase material including the above described redox-active solid mixed with a non-redox-active phase, including solid-liquid suspensions, or liquid-liquid multiphase mixtures, including micelles or emulsions having a liquid ion-storage material intimately mixed with a supporting liquid phase. Systems that utilize various working ions can include aqueous systems in which $Li^+$, $Na^+$, or other alkali ions are the working ions, even alkaline earth working ions such as $Ca^{2+}$, $Mg^{2+}$, or $Al^{3+}$. In each of these instances, a negative electrode storage material and a positive electrode storage material may be required, the negative electrode storing the working ion of interest at a lower absolute electrical potential than the positive electrode. The cell voltage can be determined approximately by the difference in ion-storage potentials of the two ion-storage electrode materials.

Systems employing both negative and positive ion-storage materials are particularly advantageous because there are no additional electrochemical byproducts in the cell. Both the positive and negative electrode materials are insoluble in the electrolyte and the electrolyte does not become contaminated with electrochemical composition products. In addition, systems employing both negative and positive lithium ion-storage materials are particularly advantageous when using non-aqueous electrochemical compositions.

In some embodiments, the semi-solid ion-storing redox compositions include materials proven to work in conventional, solid lithium-ion batteries. In some embodiments, the positive semi-solid electroactive material contains lithium positive electroactive materials and the lithium cations are shuttled between the negative electrode and positive electrode, intercalating into solid, host particles suspended in a liquid electrolyte.

In some embodiments, at least one of the semi-solid cathode 140 and/or anode 150 includes a condensed ion-storing liquid of a redox-active compound, which may be organic or inorganic, and includes but is not limited to lithium metal, sodium metal, lithium-metal alloys, gallium and indium alloys with or without dissolved lithium, molten transition metal chlorides, thionyl chloride, and the like, or redox polymers and organics that can be liquid under the operating conditions of the battery. Such a liquid form may also be diluted by or mixed with another, non-redox-active liquid that is a diluent or solvent, including mixing with such diluents to form a lower-melting liquid phase. In some embodiments, the redox-active component can comprise, by mass, at least 10% of the total mass of the electrolyte. In other embodiments, the redox-active component will comprise, by mass, between approximately 10% and 25% of the total mass of the electrolyte. In some embodiments, the redox-active component will comprise by mass, at least 25% or more of the total mass of the electrolyte.

In some embodiments, the redox-active electrode material, whether used as a semi-solid or a condensed liquid format as defined above, comprises an organic redox compound that stores the working ion of interest at a potential useful for either the positive or negative electrode of a battery. Such organic redox-active storage materials include "p"-doped conductive polymers such as polyaniline or polyacetylene based materials, polynitroxide or organic radical electrodes (such as those described in: H. Nishide et al., Electrochim. *Acta*, 50, 827-831, (2004), and K. Nakahara, et al., *Chem. Phys. Lett.*, 359, 351-354 (2002)), carbonyl based organics, and oxocarbons and carboxylate, including compounds such as $Li_2C_6O_6$, $Li_2C_8H_4O_4$, and $Li_2C_6H_4O_4$ (see for example M. Armand et al., *Nature Materials*, DOI: 10.1038/nmat2372) and organosulfur compounds.

In some embodiments, organic redox compounds that are electronically insulating are used. In some instance, the redox compounds are in a condensed liquid phase such as liquid or flowable polymers that are electronically insulating. In such cases, the redox active slurry may or may not contain an additional carrier liquid. Additives can be combined with the condensed phase liquid redox compound to increase electronic conductivity. In some embodiments, such electronically insulating organic redox compounds are rendered electrochemically active by mixing or blending with particulates of an electronically conductive material, such as solid inorganic conductive materials including but not limited to metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments.

In some embodiments, such electronically insulating organic redox compounds are rendered electrochemically active by mixing or blending with an electronically conductive polymer, including but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocene-substituted polyethylene, carbazole-substituted polyethylene, polyoxyphenazine, polyacenes, or poly(heteroacenes. The conductive additives form an electrically conducting framework within the insulating liquid redox compounds that significantly increases the electrically conductivity of the composition. In some embodiments, the conductive addition forms a percolative pathway to the current collector. In some embodiments the redox-active electrode material comprises a sol or gel, including for example metal oxide sols or gels produced by the hydrolysis of metal alkoxides, amongst other methods generally known as "sol-gel processing." Vanadium oxide gels of composition $V_xO_y$ are amongst such redox-active sol-gel materials.

Other suitable positive active materials for use in the cathode 140 include solid compounds known to those skilled in the art as those used in NiMH (Nickel-Metal Hydride) or Nickel Cadmium (NiCd) batteries. Still other positive electrode compounds for Li storage include those used in carbon monofluoride batteries, generally referred to as CFx, or metal fluoride compounds having approximate stoichiometry $MF_2$ or $MF_3$ where M comprises, for example, Fe, Bi, Ni, Co. Ti, or V. Examples include those described in H. Li, P. Balaya, and J. Maier, Li-Storage via Heterogeneous Reaction in Selected Binary Metal Fluorides and Oxides, *Journal of The Electrochemical Society*, 151 [11] A1878-A1885 (2004), M. Bervas, A. N. Mansour, W.-S. Woon, J. F. Al-Sharab, F. Badway, F. Cosandey, L. C. Klein, and G. G. Amatucci, "Investigation of the Lithiation and Delithiation Conversion Mechanisms in a Bismuth Fluoride Nanocomposites". J. Electrochem. Soc., 153, A799 (2006), and I. Plitz, F. Badway, J. AI-Sharab. A. DuPasquier, F. Cosandey and G. G. Amatucci, "Structure and Electrochemistry of Carbon-Metal Fluoride Nanocomposites Fabricated by a Solid State Redox Conversion Reaction", *J. Electrochem. Soc.*, 152, A307 (2005).

As another example, fullerenic carbon including single-wall carbon nanotubes (SWNTs), multiwall carbon nanotubes (MWNTs), or metal or metalloid nanowires may be used as ion-storage materials. One example is the silicon nanowires used as a high energy density storage material in a report by C. K. Chan, H. Peng, G. Liu, K. Mcllwrath, X, F. Zhang, R. A. Huggins, and Y. Cui, High-performance lithium battery anodes using silicon nanowires, *Nature Nanotechnology*, published online 16 Dec. 2007; doi: 10.1038/nnano.2007.411. In some embodiments, electroactive materials for the cathode 140 in a lithium system can include the general family of ordered rocksalt compounds $LiMO_2$ including those having the $\alpha$-$NaFeO_2$ (so-called "layered compounds") or orthorhombic-$LiMnO_2$ structure type or their derivatives of different crystal symmetry, atomic ordering, or partial substitution for the metals or oxygen. M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, Li(Ni, Co. Al)$O_2$ (known as "NCA") and Li(Ni, Mn, Co)$O_2$ (known as "NMC"). Other families of exemplary cathode 140 electroactive materials includes those of spinel structure, such as $LiMn_2O_4$ and its derivatives, so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds such as $LiVPO_4F$, other "polyanion" compounds as described below, and vanadium oxides $V_xO_y$ including $V_2O_5$ and $V_6O_{11}$.

In some embodiments, the cathode 140 electroactive material comprises a transition metal polyanion compound, for example as described in U.S. Pat. No. 7,338,734. In some embodiments the active material comprises an alkali metal transition metal oxide or phosphate, and for example, the compound has a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, and have values such that x, plus y(1−a) times a formal valence or valences of M', plus ya times a formal valence or valence of M", is equal to z times a formal valence of the $XD_4$, $X_2D_7$, or $DXD_4$ group; or a compound comprising a composition $(A_{1-a}M''_a)_xM'_y(XD_4)_z$, $(A_{1-a}M''_a)_xM'_y(DXD_4)_z(A_{1-a}M''_a)_x M'_y(X_2D_7)_z$ and have values such that (1−a)x plus the quantity ax times the formal valence or valences of M" plus y times the formal valence or valences of M' is equal to z times the formal valence of the $XD_4$, $X_2D_7$ or $DXD_4$ group. In the compound, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen. The positive electroactive material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In other embodiments, the lithium transition metal phosphate material has an overall composition of $Li_{1-x-z}M_{1+z}PO_4$, where M comprises at least one first row transition metal selected from the group consisting of Ti, V, Cr, Mn, Fe, Co and Ni, where x is from 0 to 1 and z can be positive or negative. M includes Fe, z is between about 0.15-0.15. The material can exhibit a solid solution over a composition range of 0<x<0.15, or the material can exhibit a stable solid solution over a composition range of x between 0 and at least about 0.05, or the material can exhibit a stable solid solution over a composition range of x between 0 and at least about 0.07 at room temperature (22-25° C.). The material may also exhibit a solid solution in the lithium-poor regime, e.g., where x≥0.8, or x≥0.9, or x≥0.95.

In some embodiments the redox-active electrode material comprises a metal salt that stores an alkali ion by undergoing a displacement or conversion reaction. Examples of such compounds include metal oxides such as CoO, $Co_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the positive electrode in a lithium battery. In other embodiments the redox-active electrode material comprises carbon monofluoride or its derivatives. In some embodiments the material undergoing displacement or conversion reaction is in the form of particulates having on average dimensions of 100 nanometers or less. In some embodiments the material undergoing displacement or conversion reaction comprises a nanocomposite of the active material mixed with an inactive host, including but not limited to conductive and relatively ductile compounds such as carbon, or a metal, or a metal sulfide. $FeS_2$ and $FeF_3$ can also be used as cheap and electronically conductive active materials in a nonaqueous or aqueous lithium system.

In some embodiments, the working ion is selected from the group consisting of $Li^+$, $Na^+$, $H^+$, $Mg^{2+}$, $Al^{3+}$, or $Ca^{2+}$.

In some embodiments, the working ion is selected from the group consisting of $Li^+$ or $Na^+$.

In some embodiments, the semi-solid ion-storing redox composition includes a solid including an ion-storage compound.

In some embodiments, the ion is proton or hydroxyl ion and the ion storage compound includes those used in a nickel-cadmium or nickel metal hydride battery.

In some embodiments, the ion is lithium and the ion storage compound is selected from the group consisting of metal fluorides such as $CuF_2$, $FeF_2$, $FeF_3$, $BiF_3$, $CoF_2$, and $NiF_2$.

In some embodiments, the ion is lithium and the ion storage compound is selected from the group consisting of metal oxides such as $COO$, $Co_3O_4$, $NiO$, $CuO$, $MnO$.

In some embodiments, the ion is lithium and the ion storage compound includes an intercalation compound selected from compounds with formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In some embodiments, the ion is lithium and the ion storage compound includes an intercalation compound selected from compounds with formula $LiMPO_4$, where M is one or more of V, Cr, Mn, Fe, Co, and Ni, in which the compound is optionally doped at the Li, M or O-sites.

In some embodiments, the ion is lithium and the ion storage compound includes an intercalation compound selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, wherein x, plus y(1−a) times a formal valence or valences of M', plus ya times a formal valence or valence of M'', is equal to z times a formal valence of the $XD_4$, $X_2D_7$, or $DXD_4$ group; and A is at least one of an alkali metal and hydrogen, M' is a first-row transition metal, X is at least one of phosphorus, sulfur, arsenic, molybdenum, and tungsten, M'' any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the ion storage compound includes an intercalation compound selected from the group consisting of $A_{1-a}M''_a)_xM'_y(XD_4)_z$, $(A_{1-a}M''_a)_xM'_y(DXD_4)z$ and $A_{1-a}M''_a)_xM'_y(X_2D_7)_z$, where (1−a)x plus the quantity ax times the formal valence or valences of M'' plus y times the formal valence or valences of M' is equal to z times the formal valence of the $XD_4$, $X_2D_7$ or $DXD_4$ group, and A is at least one of an alkali metal and hydrogen, M' is a first-row transition metal, X is at least one of phosphorus, sulfur, arsenic, molybdenum, and tungsten, W any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the ion storage compound includes an intercalation compound selected from the group consisting of ordered rocksalt compounds $LiMO_2$ including those having the including those having the α-$NaFeO_2$ and orthorhombic —$LiMnO_2$ structure type or their derivatives of different crystal symmetry, atomic ordering, or partial substitution for the metals or oxygen, where M includes at least one first-row transition metal but may include non-transition metals including but not limited to Al, Ca, Mg or Zr.

In some embodiments, the semi-solid ion storing redox composition includes a solid including amorphous carbon, disordered carbon, graphitic carbon, or a metal-coated or metal decorated carbon.

In some embodiments, the semi-solid ion storing redox composition can include a solid including nanostructures, e.g., nanowires, nanorods, and nanotetrapods.

In some embodiments, the semi-solid ion storing redox composition includes a solid including an organic redox compound.

In some embodiments, the positive electrode can include a semi-solid ion storing redox composition including a solid selected from the groups consisting of ordered rocksalt compounds $LiMO_2$ including those having the α-$NaFeO_2$ and orthorhombic-$LiMnO_2$ structure type or their derivatives of different crystal symmetry, atomic ordering, or partial substitution for the metals or oxygen, wherein M Includes at least one first-row transition metal but may include non-transition metals including but not limited to Al, Ca, Mg, or Zr. The negative electrode can includes a semi-solid ion-storing composition including a solid selected from the group consisting of amorphous carbon, disordered carbon, graphitic carbon, or a metal-coated or metal-decorated carbon.

In some embodiments, the positive electrode can include a flowable semi-solid ion-storing redox composition including a solid selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)$, and where x, plus y(1−a) times a formal valence or valences of M', plus ya times a formal valence or valence of M'', is equal to z times a formal valence of the $XD_4$, $X_2D_7$, or $DXD_4$ group, and A is at least one of an alkali metal and hydrogen, M' is a first-row transition metal, X is at least one of phosphorus, sulfur, arsenic, molybdenum, and tungsten, M'' any of a Group IIA, IIIA, IVA, VA, VIA, VIIA, VIIIA, IB, IIB, IIIB, IVB, VB, and VIB metal, D is at least one of oxygen, nitrogen, carbon, or a halogen and the negative electrode includes a flowable semi-solid ion-storing redox composition including a solid selected from the group consisting of amorphous carbon, disordered carbon, graphitic carbon, or a metal-coated or metal-decorated carbon.

In some embodiments, the positive electrode can include a flowable semi-solid ion-storing redox composition including a compound with a spinel structure.

In some embodiments, the positive electrode includes a flowable semi-solid ion-storing redox composition including a compound selected from the group consisting of $LiMn_2O_4$ and its derivatives; layered-spinel nanocomposites in which the structure includes nanoscopic regions having ordered rocksalt and spinel ordering; so-called "high voltage spinels" with a potential vs. Li/Li+ that exceeds 4.3V including but not limited to LiNi0.5Mn1.5O4; olivines $LiMPO_4$ and their derivatives, in which M includes one or more of Mn, Fe, Co. or Ni, partially fluorinated compounds such as $LiVPO_4F$, other "polyanion" compounds, and vanadium oxides $V_xO_y$ including $V_2O_5$ and $V_6O_{11}$.

In some embodiments the semi-solid battery is a lithium battery, and the anode 150 compound comprises graphite, graphitic or non-graphitic carbon, amorphous carbon, mesocarbon microbeads, boron-carbon alloys, hard or disordered carbon, lithium titanate spinel, or a solid metal or metal alloy or metalloid or metalloid alloy that reacts with lithium to form intermetallic compounds, e.g., Si, Ge, Sn, Bi, Zn, Ag, Al, any other suitable metal alloy, metalloid alloy or combination thereof. More particularly the metals, metal alloys, or metalloids are selected from a group that has a high capacity for intercalating lithium such as, for example, silicon, bismuth, barium, gallium, indium, zinc, tin, antimony, aluminum, gold, titanium oxide, molybdenum, germanium, manganese, niobium, vanadium, tantalum, iron, copper, chromium, nickel, cobalt, zirconium, yttrium, molybdenum oxide, germanium oxide, silicon oxide, silicon carbide, or a lithiated metal or metal alloy including such compounds as LiAl, $Li_9Al_4$, $Li_3Al$, LiZn, LiAg, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_3$, $Li_7Sn_2$, $Li_{22}Sn_5$, $Li_2Sb$, $Li_3Sb$, LiBi, or $Li_3Bi$, or amorphous metal alloys of lithiated or non-lithiated compositions, any other high capacity materials or alloys thereof, or any other combination thereof. In some embodiments, the high capacity material in the anode 150 can result in the anode 150 having a capacity in the range of about 700 mAh/g to about 1,200 mAh/g.

In some embodiments, the electrochemical function of the semi-solid redox cell is improved by mixing or blending the cathode 140 and/or anode 150 particles with particulates of an electronically conductive material, such as solid inorganic conductive materials including but not limited to metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments. In some embodiments, such electronically insulating organic redox compounds are rendered electronically active by mixing or blending with an electronically conductive polymer, including but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocene-substituted polyethylene, carbazole-substituted polyethylene, polyoxyphenazine, polyacenes, or poly(heteroacenes). In some embodiments, the resulting cathode or anode mixture has an electronic conductivity of at least about $10^{-6}$ S/cm. In other embodiments, the mixture has an electronic conductivity between approximately $10^{-6}$ S/cm and $10^{-3}$ S/cm. In other embodiments, the mixture has an electronic conductivity of at least about $10^{-5}$ S/cm, or at least about $10^{-4}$ S/cm, of at least about $10^{-3}$ S/cm, of at least about $10^{-2}$ S/cm or more.

In some embodiments, the particles included in the semi-solid anode or cathode can be configured to have a partial or full conductive coating.

In some embodiments, the semi-solid ion-storing redox composition includes an ion-storing solid coated with a conductive coating material. In some embodiments, the conductive coating material has higher electron conductivity than the solid. In some embodiments, the solid is graphite and the conductive coating material is a metal, metal carbide, metal oxide, metal nitride, or carbon. In some embodiments, the metal is copper.

In some embodiments, the solid of the semi-solid ion-storing material is coated with metal that is redox inert at the operating conditions of the redox energy storage device. In some embodiments, the solid of the semi-solid ion storing material is coated with copper to increase the conductivity of the storage material particle, to increase the net conductivity of the semi-solid, and/or to facilitate charge transfer between energy storage particles and conductive additives. In some embodiments, the storage material particle is coated with, about 1.5% by weight metallic copper. In some embodiments, the storage material particle is coated with about 3.0% by weight metallic copper. In some embodiments, the storage material particle is coated with about 8.5% by weight metallic copper. In some embodiments, the storage material particle is coated with about 10.0% by weight metallic copper. In some embodiments, the storage material particle is coated with about 15.0%, by weight metallic copper. In some embodiments, the storage material particle is coated with about 20.0% by weight metallic copper.

In some embodiments, the conductive coating is placed on the cathode 140 and/or anode 150 particles by chemical precipitation of the conductive element and subsequent drying and/or calcination.

In some embodiments, the conductive coating is placed on the cathode 140 and/or anode 150 particles by electroplating (e.g., within a fluidized bed).

In some embodiments, the conductive coating is placed on the cathode 140 and/or anode 150 particles by co-sintering with a conductive compound and subsequent comminution.

In some embodiments, the electrochemically active particles have a continuous intraparticle conductive material or are embedded in a conductive matrix.

In some embodiments, a conductive coating and intraparticulate conductive network is produced by multicomponent-spray-drying, a semi-solid cathode 140 and/or anode 150 particles and conductive material particulates.

In some embodiments, the semi-solid composition also includes conductive polymers that provide an electronically conductive element. In some embodiments, the conductive polymers are one or more of a polyacetylene, polyaniline, olythiophene, polypyrrole, poly(p-phenylene), poly(triphenylene), polyazulene, polyfluorene, polynaphtalene, polyanthracene, polyfuran, polycarbazole, polyacenes, poly(heteroacenes). In some embodiments, the conductive polymer is a compound that reacts in-situ to form a conductive polymer on the surface of the active material particles. In some embodiments, the compound can be 2-hexylthiophene or 3-hexylthiophene and oxidizes during charging of the battery to form a conductive polymer coating on solid particles in the cathode semi-solid suspension. In other embodiments, redox active material can be embedded in conductive matrix. The redox active material can coat the exterior and interior interfaces in a flocculated or agglomerated particulate of conductive material. In some embodiments, the redox-active material and the conductive material can be two components of a composite particulate. Without being bound by any theory or mode of operation, such coatings can pacify the redox active particles and can help prevent undesirable reactions with carrier liquid or electrolyte. As such, it can serve as a synthetic solid-electrolyte interphase (SEI) layer.

In some embodiments, inexpensive iron compounds such as pyrite ($FeS_2$) are used as inherently electronically conductive ion storage compounds. In some embodiments, the ion that is stored is $Li^+$.

In some embodiments, redox mediators are added to the semi-solid to improve the rate of charge transfer within the semi-solid electrode. In some embodiments, this redox mediator is ferrocene or a ferrocene-containing polymer. In some embodiments, the redox mediator is one or more of tetrathiafulvalene-substituted polystyrene, ferrocene-substituted polyethylene, carbazole-substituted polyethylene.

In some embodiments, the surface conductivity or charge transfer resistance of current collectors 1101/120 used in the semi-solid battery is increased by coating the current collector surface with a conductive material. Such layers can also serve as a synthetic SEI layer. Non-limiting examples of conductive coating materials include carbon, a metal, metal-carbide, metal nitride, metal oxide, or conductive polymer. In some embodiments, the conductive polymer includes but is not limited to polyaniline or polyacetylene based conductive polymers or poly(3,4-ethylenedioxythiophene) (PEDOT), polypyrrole, polythiophene, poly(p-phenylene), poly (triphenylene), polyazulene, polyfluorene, polynaphtalene, polyanthracene, polyfuran, polycarbazole, tetrathiafulvalene-substituted polystyrene, ferrocene-substituted polyethylene, carbazole-substituted polyethylene, polyoxyphenazine, polyacenes, or poly(heteroacenes). In some embodiments, the conductive polymer is a compound that reacts in-situ to form a conductive polymer on the surface of the current collector. In some embodiments, the compound is 2-hexylthiophene and oxidizes at a high potential to form a conductive polymer coating on the current collector. In some embodiments; the current collector is coated with metal that is redox-inert at the operating conditions of the redox energy storage device.

The semi-solid redox compositions can include various additives to improve the performance of the redox cell. The liquid phase of the semi-solids in such instances would comprise a solvent, in which is dissolved an electrolyte salt, and binders, thickeners, or other additives added to improve stability, reduce gas formation, improve SEI formation on the negative electrode particles, and the like. Examples of such additives included vinylene carbonate (VC), vinylethylene carbonate (VEC), fluoroethylene carbonate (FEC), or alkyl cinnamates, to provide a stable passivation layer on the anode or thin passivation layer on the oxide cathode, propane sultone (PS), propene sultone (PrS), or ethylene thiocarbonate as antigassing agents, biphenyl (BP), cyclohexylbenzene, or partially hydrogenated terphenyls, as gassing/safety/cathode polymerization agents, or lithium bis (oxatlato)borate as an anode passivation agent.

In some embodiments, the semi-solid cathode 140 and/or anode 150 can include a non-aqueous liquid electrolyte that can include polar solvents such as, for example, alcohols or aprotic organic solvents. Numerous organic solvents have been proposed as the components of Li-ion battery electrolytes, notably a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include y-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propionitrile, ethyl acetate, methyl propionate, ethyl propionate, dimethyl carbonate, tetraglyme, and the like. These nonaqueous solvents are typically used as multicomponent mixtures, into which a salt is dissolved to provide ionic conductivity. Exemplary salts to provide lithium conductivity include $LiClO_4$, $LiPF_6$, $LiBF_4$, LiTFSI, LiBETI, LiBOB, and the like.

In some embodiments, the non-aqueous cathode 140 and/or anode 150 semi-solid compositions are prevented from absorbing impurity water and generating acid (such as HF in the case of $LiPF_6$ salt) by incorporating compounds that getter water into the active material suspension, or into the storage tanks or other plumbing of the system, for example, in the case of redox flow cell batteries. Optionally, the additives are basic oxides that neutralize the acid. Such compounds include but are not limited to silica gel, calcium sulfate (for example, the product known as Drierite), aluminum oxide and aluminum hydroxide.

In some embodiment, the cathode 140 can be a semi-solid cathode and the anode 150 can be a conventional anode for example, a solid anode formed from the calendering process as known as is commonly known in the arts. In some embodiments, the cathode 140 can be a semi-solid cathode and the anode 150 can also be a semi-solid anode as described herein. In some embodiments, the cathode 140 and the anode 150 can both be semi-solid flowable electrodes, for example, for use in a redox flow cell.

FIG. 2 shows a schematic illustration of an electrochemical cell 200 that includes a positive current collector 210, a negative current collector 220, and a separator 230 disposed between the positive current collector 210 and the negative current collector 220. Both the positive current collector 210 and the negative current collector have a thickness $t_3$ and the separator 230 has a thickness $t_4$. A cathode 240 having a thickness $t_5$ is disposed between the positive current collector 210 and the separator 230, and an anode 250 having a thickness $t_6$ is disposed between the negative current collector 220 and the separator 230.

The cathode 240 and anode 250 of the electrochemical cell 200 can be formed using a conventional coating and calendering process. For example, the cathode 240 and anode 250 can be manufactured by mixing electrochemically active ion-storage compounds (active materials), electronically conductive additives, and polymeric binders with a solvent to form a slurry, coating the slurry onto metal foil current collectors 210 and 220, and then calendering the coated current collector under high pressure to increase density and control thickness of the finished electrode. The finished electrode is then slit/cut into sizes and/or shapes that are appropriate for the form factor of the manufactured battery. The slit electrode composites can then be co-wound or co-stacked with intervening separator 230 layers to construct battery windings, i.e. "jelly-rolls" or "stacks", which are then packaged in metal cans, flexible polymer pouches, etc. The resulting electrochemical cell is then infiltrated with liquid electrolyte in a carefully controlled environment.

The anode 250 can be a conventional anode (e.g., carbon-based) such that the anode 250 and the cathode 240 can have comparable capacities such as, for example, about 150-200 mAh/g. Thus, the thickness $t_5$ of the cathode 240 and the thickness $t_6$ of the anode 250 are substantially the same, e.g., about 150 μm, and the capacities of the anode 240 and the cathode 250 are "matched." The thickness to of the separator 220 is typically substantially less than the thickness $t_5$ of the cathode 240 and thickness to of the anode 250 e.g., about 20 μm. The current collectors can be metal foils having a thickness comparable to the separator, e.g., about 20 μm.

One significant disadvantage of the conventional electrodes used in the electrochemical cell 200 is that the loading density of the active materials cannot be increased to increase the capacity of the electrodes, in part, due to manufacturing limitation of the coating/calendering process. Increasing the thickness of the electrodes in conventional electrochemical cells beyond 150-200 μm is also not practical because: (1) thicker electrodes made using the conventional coating/calendering process tend to delaminate from the current collectors during the high speed coating process and rolling process, and (2) thick electrodes made using the conventional coating/calendering process have low conductivity, which dramatically increases the cell impedance. To overcome these limitations, a series of cells are typically stacked to obtain the desired capacity. This stacking of cells results in a significant portion of the volume of the battery to be occupied by inactive materials, i.e., the separator 230 and current collectors 210 and 220. Therefore, the ratio of active to inactive materials is low, which correlates to a significant reduction in energy density.

For example, if the thickness $t_3$ of the current collectors 210 and 220 is 20 µm each, and the thickness $t_4$ of the separator 230 is also 20 µm, the total inactive material thickness is 60 sm. If the thickness $t_5$ of the cathode 240 is 150 µm and the thickness $t_6$ of the anode 250 is also 150 µm, the total active material thickness is 300 µm. Therefore, approximately 16% of the total thickness of the electrochemical cell 200 is occupied by inactive material, which does not contribute to the energy density and charge capacity of the battery.

One option for producing higher energy capacity is through the use of high capacity active materials, e.g., Si or Sn, in the anode composition. FIG. 3 shows a schematic illustration of a high capacity electrochemical cell 300 that includes a positive current collector 310, a negative current collector 320, and a separator 330 disposed between the positive current collector 310 and the negative current collector 320. Both the positive current collector 310 and the negative current collector 320 have a thickness $t_7$ and the separator 330 has a thickness $t_8$. A cathode 340 having a thickness $t_9$ is disposed between the positive current collector 310 and the separator 330, and a high capacity anode 350 having a thickness $t_{10}$ is disposed between the negative current collector 320 and the separator 330.

The cathode 340 can be any conventional cathode that uses binders. The cathode 340 can be manufactured using a conventional method as described with reference to FIG. 2. The thickness $t_9$ of the conventional cathode 340 can be, for example, about 150 µm and can have a capacity, for example, of about 150-200 mAh/g. The anode 350 is a high capacity anode that includes a high capacity material, e.g., Si or Sn and can have any composition as described herein. The anode 350 can have a capacity of about 700-1,200 mAh/g. Although the anode 350 has a much higher capacity compared with a conventional anode, e.g., the anode 250, the anode 350 capacity has to be matched with the capacity of cathode 350. Since the conventional cathode 340 used in the electrochemical cell 300 cannot have a thickness ty greater than about 150-200 µm due to limitations as described herein, the anode 350 has to be made thinner. For example, high capacity anode 350 can have a thickness $t_{10}$ of about 30-50 µm to have a capacity that matches the capacity of the cathode 340. Coatings on the order of 30-50 µm begin to approach the thickness level of a single graphite particle and therefore are manufactured using expensive fabrication processes, e.g., atomic layer deposition, vapor deposition, sputtering, and the likes. This limitation prevents the full utilization of the potential energy capacity achievable with the high capacity anode 350.

In order to increase the capacity of a battery, a series of individual cells 300 can be stacked, as described with reference to the electrochemical cell 200. Although the capacity of electrochemical cells 200 and 300 are substantially equivalent, more individual cells 300 can fit into a "stack" of a given form factor because the anode 350 is significantly thinner than the anode 250. However, a significant percentage of the finished battery is still occupied by the inactive materials. For example, the thickness $t_7$ of the current collectors 310 and 320 is the same as current collectors 210 and 220 (i.e., 20 µm each), and the thickness $t_8$ of the separator 330 is the same as the separator 230 (i.e., 20 µm), which represents the total inactive material thickness of 60 µm. If the thickness $t_9$ of the cathode 340 is the same as the cathode 240 (i.e., 150 µm) and the thickness $t_{10}$ of the high capacity anode 350 is 50 µm, the total active material thickness is 200 µm. Therefore, approximately 23% of the total thickness of the electrochemical cell 300 is occupied by inactive material, which does not contribute to the energy density and charge capacity of the battery. Although the capacity of the finished battery in this example utilizing electrochemical cells 300 would be greater than the capacity of the finished battery utilizing electrochemical cells 200 because the thinner anodes 350 allow more cells 300 to fit into the same form factor, a higher percentage (23% vs. 16%) of the finished battery is made from materials that are not contributing to charge capacity of the battery, thus, reducing its energy density. Said another way, while the high capacity anode 350 enables the stacking of more electrochemical cells 300 in a battery compared to the conventional anode 250 to get a higher capacity battery, the percentage of the inactive material is also higher which negates some of this benefit.

As described herein, increasing the thickness of the cathode and/or increasing the active material loading in the cathode are two ways that the benefits of a high capacity anode can be utilized. While these are not viable options with conventional cathodes for the reasons described above, various embodiments of semi-solid cathodes described herein can be made thicker than the maximum thickness of 200 µm achievable with conventional cathodes and with loading densities that can be up to 5 times higher than conventional cathodes. FIG. 4 shows a schematic illustration of an electrochemical cell 400 that includes a positive current collector 410, a negative current collector 420, and a separator 430 disposed between the positive current collector 410 and the negative current collector 420. Both the positive current collector 410 and the negative current collector 420 have a thickness $t_{11}$ and the separator 430 has a thickness $t_{12}$. A semi-solid cathode 440 having a thickness $t_{13}$ is disposed between the positive current collector 410 and the separator 430, and a high capacity anode 450 having a thickness $t_{14}$ is disposed between the negative current collector 420 and the separator 430.

The anode 450 is a high capacity anode that can be formed using conventional methods as described before with reference to FIG. 2 or any other conventional method. In some embodiments, the anode 450 can be a stationary semi-solid or a flowable semi-solid anode as described herein. The cathode 440 is a semi-solid cathode that can be a stationary semi-solid cathode or a flowable semi-solid cathode as described herein. In some embodiments, the semi-solid cathode is substantially free from binders that are typically used in conventional calendered electrodes. In contrast to conventional cathodes, e.g., the cathodes 240 and 340, the semi-solid cathode 440 can be made thicker than 200 µm such as, for example, thicker than 250 µm, 300 µm, 350 µm, 400 µm, 450 µm, 500 µm, 600 µm, 700 µm, 800 µm, 900 µm, 1,000 µm, or 1,500 µm, and up to 2,000 µm or more as described herein. In some embodiment, the cathode can be at least about two times, three times, four times, five times, or even six times the thickness of the anode. The semi-solid cathode 440 can also formulated to have up to five times the loading density of conventional cathodes. The thicker cathode 440 and higher loading densities can be achieved with the semi-solid cathode 440 without the negative consequences associated with thicker conventional electrodes.

The ability to substantially increase the thickness $t_{13}$ of the semi-solid cathode 440 eliminates the restriction on the thickness $t_{14}$ of the high capacity anode 450 that is imposed by the limitations of the conventional cathodes, e.g., cathode 250 and 350. The anode 450 can therefore be made thicker to match the capacity of the thicker cathode 450. For example, the anode 450 can have a thickness $t_{14}$ of about 70 μm to about 200 μm using conventional coating/calendering manufacturing methods or upwards of 600 μm or even higher if a semi-solid anode is used as describe herein.

Therefore, the semi-solid cathode 440 and high capacity anode 450 of the electrochemical cell 400 formed using formulations and methodologies described herein can allow the maximum capacity offered by the high capacity materials of the anode 450 to be utilized in an electrochemical cell with fewer stacks. In some embodiments, the semi-solid cathode 440 and high capacity anode 450 can be used to make a single electrochemical cell 400 without any stacking. Because stacking is not needed or the number of stacks in a battery using the semi-solid cathode 440 is substantially less than the number of stacks needed in a high capacity anode and conventional cathode battery, for example electrochemical cell 3000, or a conventional anode, conventional cathode battery, for example, electrochemical cell 200, the ratio of active materials to inactive materials in a cell stack formed from electrochemical cell 400, is substantially higher than that of the electrochemical cells 200 and 300. Thus, most of the volume of the assembled battery is occupied by active charge storing materials, which leads to increased overall charge capacity and energy density of the battery. For example, as shown in FIG. 4, the thickness $t_{11}$ of the current collectors 410 and 420 is the same as current collectors 310 and 320 (i.e., 20 μm each), and the thickness $t_{12}$ of the separator 430 is the same as the separator 330 (i.e., 20 μm), which represents the total inactive material thickness of 60 μm. If the thickness $t_{13}$ of the semi-solid cathode 440 is 500 μm and the thickness $t_{14}$ of the high capacity anode 450 is 150 μm, the total active material thickness is 650 μm. Therefore, approximately 8.4% of the total thickness of the electrochemical cell 400 is occupied by inactive material, which does not contribute to the energy density and charge capacity of the battery. Since the percentage of inactive materials in the electrochemical cell 400 is approximately half the percentage of inactive materials in the electrochemical cell 200 (16%) and approximately one-third the percentage of inactive materials in the electrochemical cell 300 (23%), and because the full utilization of the high capacity anode 450 and higher loading density of the semi-solid cathode 440, the electrochemical cell 400 has a much higher energy density than the other electrochemical cells 20 and 300.

Furthermore, by utilizing a semi-solid anode, the high capacity anode 450 can also be made thicker than 150 μm and the semi-solid cathode 440 can be made thicker than 500 μm to match the thicker high capacity anode 450 further reducing the percentage of inactive materials, which do not contribute to the energy density and charge capacity of the battery. For example, if the thickness $t_{14}$ of a semi-solid high capacity anode 450 is 600 μm and the thickness $t_{13}$ of the semi-solid cathode 440 is increased to 2,000 μm, the total active material thickness is 2,600 μm. If the thickness of the current collectors 410 and 420, and separator 430 have the same thickness as above (i.e., of the 20 μm each), the percentage of inactive materials is approximately only 2.2%. Therefore, electrochemical cells 400 made with the aforesaid materials and methods have a substantially higher commercial appeal due, in part, to their increased energy density and decreased cost.

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. An electrochemical cell, comprising:
a semi-solid cathode;
an anode including a high charge capacity; and
a separator disposed between the anode and the semi-solid cathode,
wherein the semi-solid cathode has a thickness of at least about two times a thickness of the anode.

2. The electrochemical cell of claim 1, wherein the cathode is a slurry cathode.

3. The electrochemical cell of claim 1, wherein the thickness of the cathode is in the range of about three to about six times the thickness of the anode.

4. The electrochemical cell of claim 1, wherein the anode includes a lithium-alloy-forming compound including at least one of tin, tin alloys, silicon, silicon alloys, antimony, aluminum, and titanium oxide.

5. The electrochemical cell of claim 1, wherein the anode is a semi-solid anode including a mixture of an anode active material in a liquid electrolyte.

6. The electrochemical cell of claim 5, wherein the liquid electrolyte in the semi-solid anode is a non-aqueous liquid electrolyte.

7. The electrochemical cell of claim 6, wherein the semi-solid anode includes about 40% to about 75% by volume of an active material.

8. The electrochemical cell of claim 1, wherein the anode has a thickness in the range of about 60 μm to about 150 μm.

9. The electrochemical cell of claim 1, wherein the anode has a thickness in the range of about 30 μm to about 600 μm.

10. An electrochemical cell, comprising:
a semi-solid cathode having a thickness;
an anode having a capacity in the range of about 700 mAh/g to about 1,200 mAh/g; and
a separator disposed between the anode and the semi-solid cathode,
wherein a thickness of the anode is in the range of about 20% to about 50% of the thickness of the semi-solid cathode.

11. The electrochemical cell of claim 10, wherein the anode includes a lithium-alloy-forming compound including at least one of tin, tin alloys, silicon, silicon alloys, antimony, aluminum, and titanium oxide.

12. The electrochemical cell of claim 11, wherein the lithium-alloy-forming compound includes silicon.

13. The electrochemical cell of claim 11, wherein the lithium-alloy-forming compound includes tin.

14. The electrochemical cell of claim 10, wherein the thickness of the cathode is in the range of about 3 times to about 6 times the thickness of the anode.

15. The electrochemical cell of claim 10, wherein the anode is a semi-solid anode including a mixture of an anode active material in a liquid electrolyte.

16. The electrochemical cell of claim 15, wherein the liquid electrolyte in the semi-solid anode is a non-aqueous liquid electrolyte.

17. The electrochemical cell of claim 10, wherein the anode has a thickness in the range of about 30 µm to about 600 µm.

18. An electrochemical cell, comprising:
   a first electrode;
   a second electrode, the second electrode having a semi-solid composition including an active material in a liquid electrolyte; and
   a separator disposed between the first electrode and the second electrode;
wherein the second electrode has a thickness at least about two times a thickness of the first electrode.

19. The electrochemical cell of claim 18, wherein the thickness of the first electrode is at least about three times the thickness of the second electrode.

20. The electrochemical cell of claim 18, wherein the second electrode is a semi-solid anode including about 40% to about 75% by volume of an active material.

21. The electrochemical cell of claim 18, wherein the first electrode has a thickness in the range of about 30 µm to about 600 µm.

22. The electrochemical cell of claim 18, wherein the second electrode has a thickness in the range of about 250 µm to about 2,000 µm.

23. The electrochemical cell of claim 18, wherein the second electrode is a semi-solid anode including a carbonaceous active material, a high energy capacity anode material, and a conductive material in a liquid electrolyte.

24. The electrochemical cell of claim 18, wherein the second electrode includes a lithium-alloy-forming compound including at least one of tin, tin alloys, silicon, silicon alloys, antimony, aluminum, and titanium oxide.

25. The electrochemical cell of claim 24, wherein the lithium-alloy-forming compound includes silicon.

26. The electrochemical cell of claim 24, wherein the lithium-alloy-forming compound includes tin.

* * * * *